United States Patent Office 3,544,330

Patented Dec. 1, 1970

3,544,330
GLASSES AND CAPACITOR DIELECTRIC COMPOSITIONS MADE THEREFROM

Lewis C. Hoffman, Wilmington, Del., assignor to E. I. du Pont de Nemours and Company, Wilmington, Del., a corporation of Delaware No Drawing. Filed Apr. 24, 1967, Ser. No. 632,890
Int. Cl. C03c 3/08, 3/14, 5/02
U.S. Cl. 106—54 3 Claims

ABSTRACT OF THE DISCLOSURE

The particular glasses are novel and are composed of critical proportionate amounts of CaO, $B_2O_3$, BaO, $ZrO_2$, $Al_2O_3$, $SiO_2$, ZnO, and SrO. Capacitor dielectric compositions, which are composed of the glass dispersed in an inert vehicle, are fabricated into capacitors which possess extremely low electrical loss properties and high Q-values.

BACKGROUND OF THE INVENTION

Electrical capacitors, which are devices that store electrical energy, comprise conducting plates separated by thin layers of dielectric. Vitreous compositions or glasses have been utilized as the dielectric layers in the fabrication of electrical capacitors. When utilized for such purposes, vitreous compositions or glasses possess outstanding advantages as regards to strength, ease of fabrication, stability or constancy of the dimensions and relatively low electrical losses when subjected to direct current electrical potentials. However, when the previously known vitreous compositions are subjected to alternating electrical potentials of high frequency (i.e., 50 megahertz), such as those occurring in radio circuits, television circuits, and similar apparatus, dielectric losses occur whch result in seriously reducing the efficiency of the entire circuit. In many cases the electrical losses introduced by the use of these vitreous compositions are so great that the glass cannot be used as insulators, supports, or as the dielectric layers in electrical capacitors.

The electrical losses of the capacitors may be expressed either in terms of power factor or Q-value. The power factor is defined as the sine of the dielectric loss angle, and the Q-value is the cotangent of this angle (the angle between 90 degrees and the current vector leading the voltage). As the Q-values for low-loss dielectrics lie in the range of 500–2,000, the Q-value is a convenient integral index figure, the increase of which denotes an improvement in electrical merit of a capacitor. In frequency controlled circuits, the higher the Q-value, the more narrow is the controlled frequency. Another way of describing Q-value is, the higher the Q-value, the finer is the tuning band (low distortion). Of course, a fine tuning band is desirable since less distortion permits a finer sound and/or picture in a radio or television. Thus, a high Q-value is desirable in capacitors which are presently used in the radio and telecision field. High Q-value dielectrics are also used as electrical insulators in circuits where high electrical losses and feedback between parts of the circuit are undesirable.

In an effort to find a more satisfactory material which could be used as the dielectric composition, fused quartz has sometimes been used to replace the more common vitreous compositions or glasses. Quartz possesses a much higher electrical efficiency, more particularly a higher Q-value, than most lower-melting glasses and vitreous compositions previously available. The usefulness of fused quartz is offset, however, by its extremely high melting point and its difficulty in being processed into film-form.

Thus, there is a continuing need, especially in the hybrid printed electronic circuit fields of radio and television, for capacitor dielectric compositions which have low melting points in the range of most of the usual glasses in metalizing compositions, and capacitors that are characterized by lower dielectric losses and higher Q-values than known heretofore.

SUMMARY OF THE INVENTION

This invention relates to novel glass compositions and highly useful capacitor dielectric compositions which can be printed and fired to produce highly efficient capacitors having low dielectric losses and high Q-values. The glass compositions of this invention consist essentially of 30–65 weight percent $B_2O_3$, 6–12 weight percent CaO, 3–7 weight percent BaO, 3–7 weight percent $ZrO^2$, 0–20 weight percent $Al_2O_3$, 0–25 weight percent $SiO_2$, 0–6 weight percent ZnO, and 0–6 weight percent SrO. The capacitor dielectric compositions of the present invention comprise the novel glass compositions, in finely divided form, dispersed in an inert vehicle.

Low electric loss capacitors are made by screen printing and firing the above-mentioned glass compositions as the dielectric between layers of conventional metalizing conductor capositions. Such glasses have sufficient tolerance for the components of the metalizing composition so that the capacitors formed after firing possess low electrical loss properties and high Q-values. Additionally, such glasses may be used as the glass component of the inorganic binder in electrode metalizing compositions and in fired on electrodes, when it is desired that the metalizing compositions contain an inorganic binder.

DESCRIPTION OF THE PREFERRED EMBODIMENTS

The particular glasses utilized in the dielectric compositions of this invention exploit various ingredients in a critical combination of proportions such that the compositions may be readily fired to provide capacitors having low dielectric losses and high Q-values. More particularly, these ingredients must be present within the composition ranges of weight percentages defined below in Table I.

TABLE I
[Weight percent]

| | Operable proportions | Preferred proportions |
|---|---|---|
| Ingredients: | | |
| $B_2O_3$ | 30–65 | 45–60 |
| CaO | 6–12 | 8–10 |
| BaO | 3–7 | 4–6 |
| $ZrO_2$ | 3–7 | 4–6 |
| $Al_2O_3$ | 0–20 | 12–18 |
| $SiO_2$ | 0–25 | 5–15 |
| ZnO | 0–6 | 4–5 |
| SrO | 0–6 | 0–5 |

It has been found that glasses meeting the above composition requirements impart excellent electrical and physical properties to printed and fired dielectrics, electrodes, and capacitors made therefrom. These properties include high Q-values, low dielectric constant, low maturing temperatures, good viscosity, good chemical durability, good stability with time and temperature, and compatibility with present electrodes and present screen printing processes.

The utilization in the glasses of the specified proportions of all the above metal oxides imparts the desired electrical properties and melting points to the dielectrics. In particular, the use of at least 3%, but not more than 7%, each of BaO and $ZrO_2$, drastically lowers dielectric losses and produces high Q-values in the fired dielectrics. The presence of at least 3% BaO and at least 3% $ZrO_2$ is necessary to obtain capacitors having high Q-values at high frequencies (i.e., 50 mHz.). A practical high Q capacitor must possess high Q-values at 50 mHz. (television frequency). Therefore, the lower limit of 3% is critical to obtain high Q-values at high frequencies. If more than 7 weight percent BaO or $ZrO_2$ is used, the coalescing (firing) temperature becomes too high. Therefore, it is very important to have the presence of 3–7% each of BaO and $ZrO_2$ in combination with the other metallic oxides, particularly CaO and $B_2O_3$, which, when used in the proportions indicated, impart conventional dielectric properties.

Additionally, up to 20 weight percent $Al_2O_3$, up to 25 weight percent $SiO_2$ and up to 6 weight percent of ZnO and/or SrO can be included in the glass composition to raise the low frequency (1 mHz.) Q-value and to produce a balance of the above-mentioned electrical and physical properties. The presence of $Al_2O_3$, $SiO_2$, ZnO and SrO is optional as indicated by the proportion ranges. However, it is highly advantageous to include these oxides to obtain a good balance of desirable properties.

The glasses of the invention are produced by melting any suitable batch composition yielding the prescribed metallic oxides and proportions thereof. In Table II there are listed several batch compositions which, when melted, will result in vitreous glass compositions falling within the prescribed weight percentage ranges of this invention. In practicing the invention, the batch composition to be utilized is first prepared and then melted to yield a substantially homogeneous fluid glass. The temperature maintained during melting is not critical but is usually within the range of 1100 to 1400° C. in order that rapid homogenization of the melt may be obtained. A temperature of about 1250° C. is preferred.

$Al_2O_3$, $SiO_2$, ZnO and/or SrO in the composition. Of course, as previously discussed, it is necessary to have the required amounts of $B_2O_3$, CaO, BaO and $ZrO_2$ present.

The invention is illustrated by the following examples. In the examples and elsewhere in the specification all parts, ratios and percentages of materials or components are by weight.

Various glass compositions (1–10) of Table III were prepared in frit form by melting the respective batch compositions (1–10) of Table II and pouring the homogeneous melt into water. The fritted products were then ground to fine powders of particle size ranging from 0.1 to 20 microns. These fine glass powders were dispersed in an inert vehicle consisting of 8% ethyl cellulose and 92% beta-terpineol to produce dielectric compositions. These compositions were then fabricated into electrical capacitors in a conventional manner, such as is disclosed in U.S. Pat. 2,398,176.

The capacitors were prepared by firing a 3.1 mm. square electrode print of a platinum-gold metalizing composition on a 96% alumina substrate at 750° C. for 10 minutes. The prefired bottom electrode was then covered with a print of the above-mentioned finely ground glass dielectric compositions from Table III in an organic vehicle, and then dried. Finally, a third print of the same metalizing composition was superposed on the dielectric print and the assemblage of prints was coalesced (fired) at 750° C. for 10 minutes to form the fired capacitor. Wire leads were soldered to the conductor portion of the capacitor by dipping in Sn-Pb eutetic solder. The capacitance was measured on a General Radio Model 1680 automatic capacitance bridge and the thickness was measured by means of a Starrett micrometer dial gauge. The dielectric constant was calculated from the dimensions and capacitance of the capacitor.

TABLE II

[Batch compositions, weight percent]

| | 1 | 2 | 3 | 4 | 5 | 6 | 7 | 8 | 9 | 10 |
|---|---|---|---|---|---|---|---|---|---|---|
| $H_3BO_3$, boric acid | 37.3 | 56.9 | 55.3 | 60.6 | 60.0 | 64.3 | 62.8 | 66.6 | 63.4 | 71.1 |
| $Al(OH)_3$, alumina hydrate | 21.3 | 14.7 | 16.5 | 18.0 | 18.8 | ------ | 17.0 | 16.6 | 15.8 | 9.2 |
| $SiO_2$, flint | 17.4 | 6.4 | 6.1 | 3.3 | ------ | 13.1 | 3.1 | ------ | ------ | ------ |
| $ZrO_2$, opax | 3.5 | 3.2 | 3.0 | 3.3 | 3.1 | 3.3 | 3.1 | 3.1 | 2.9 | 3.0 |
| $CaCO_3$, calcium carbonate | 12.5 | 11.4 | 12.1 | 7.2 | 11.0 | 11.7 | 6.8 | 6.7 | 6.3 | 10.8 |
| $BaCO_3$, barium carbonate | 4.5 | 4.2 | 4.0 | 4.3 | 4.0 | 4.3 | 4.1 | 4.0 | 3.8 | 3.9 |
| ZnO, zinc oxide | 3.5 | 3.2 | 3.9 | 3.3 | 3.1 | 3.3 | 3.1 | 3.0 | 2.9 | 3.0 |
| $SrCO_3$, strontium carbonate | ------ | ------ | ------ | ------ | ------ | ------ | ------ | ------ | 4.9 | ------ |

After a homogeneous fluid product is secured, it may be further processed or fabricated by any procedure well known in the art. It may, for example, be drawn or blown or pressed into the form of desired objects. Generally, the homogeneous glass fluid will be poured into water or other liquid to form a frit which may then be subsequently ground or comminuted to a powder. The product in this powdered form may then be utilized as by firing, in order to sinter or fuse it into any massive form or any desired shape.

In practicing the invention, batch mixtures given in Table II, or any other suitable batch compositions, may be employed in producing the glass compositions of Table III which may then be utilized to produce capacitor dielectrics having high electrical efficiency and high Q-values. There dielectrics may vary in nature according to the particular choice of ingredients and may be characterized in properties such as fluidity, softening point, stability against devitrification and similar properties. It is possible to depart somewhat from the specific examples tabulated provided that compositions having the constituents present within the weight percentage ranges given are utilized. However, for highest electrical efficiency and the optimum balance of electrical and physical properties, it has been found desirable to utilize The capacitance change and dissipation factor (d.f.) were measured by a three-terminal shielded cable connection to the units in a properly wired heating/cooling chamber. The Q at 1 mHz. and 50 mHz. was measured with a Boonton Radio Model 260A Q meter. The temperature at which the dissipation factor rose over 1% was recorded in Table III. The percent changes in capacitance from 25 to −55° C. and from 25 to 140° C. were also measured and recorded.

The platinum-gold metalizing composition, which was in finely divided form (0.1 to 20 microns), consisted of:

| | Percent by weight |
|---|---|
| Gold | 55 |
| Platinum | 15 |
| $Bi_2O_3$ | 12 |
| Inert vehicle (8% ethyl cellulose/92% beta-terpineol) | 15 |
| Glass (63.1% CdO, 16.9% $B_2O_3$, 12.7% $SiO_2$, 7.3% $Na_2O$) | 3 |

TABLE III

[Melted glass compositions in weight percent, and electrical properties]

| | 1 | 2 | 3 | 4 | 5 | 6 | 7 | 8 | 9 | 10 |
|---|---|---|---|---|---|---|---|---|---|---|
| $B_2O_3$ | 30.0 | 50.0 | 51.2 | 51.2 | 55.0 | 55.0 | 56.2 | 61.2 | 61.2 | 65.0 |
| $Al_2O_3$ | 20.0 | 15.0 | 17.7 | 17.7 | 20.0 | ------- | 17.7 | 17.7 | 17.7 | 10.0 |
| $SiO_2$ | 25.0 | 10.0 | 10.0 | 5.0 | ------- | 20.0 | 5.0 | ------- | ------- | ------- |
| $ZrO_2$ | 5.0 | 5.0 | 5.0 | 5.0 | 5.0 | 5.0 | 5.0 | 5.0 | 5.0 | 5.0 |
| CaO | 10.0 | 10.0 | 11.1 | 6.1 | 10.0 | 10.0 | 6.1 | 6.1 | 6.1 | 10.0 |
| BaO | 5.0 | 5.0 | 5.0 | 5.0 | 5.0 | 5.0 | 5.0 | 5.0 | 5.0 | 5.0 |
| ZnO | 5.0 | 5.0 | ------- | ------- | 5.0 | 5.0 | 5.0 | 5.0 | ------- | 5.0 |
| SrO | ------- | ------- | ------- | ------- | ------- | ------- | ------- | ------- | 5.0 | ------- |
| K, 1 KHz | 7 | 9 | 11 | 8 | 8 | 6 | 9 | 8 | 12 | 7 |
| Q, 1 MHz | 811 | 867 | 1,204 | 1,094 | 880 | 826 | 1,324 | 1,097 | 861 | 1,492 |
| Q, 50 MHz | 839 | 839 | 1,101 | 1,312 | 1,335 | 1,124 | 1,128 | 1,276 | 907 | 1,978 |
| Temp., ° C. for 1% d.f. at 1 KHz | 105 | 95 | 110 | 75 | 100 | 95 | 110 | 90 | 105 | 95 |
| Cap. change, percent, 25 to −55 ° C | −3.1 | −4.0 | −2.1 | −5.0 | −3.4 | −2.5 | −2.0 | −3.0 | −1.5 | −2.4 |
| Cap. change, percent, 25 to 140° C | +7.5 | +10.2 | +8.1 | +11.3 | +9.4 | +12.6 | +9.5 | +11.5 | +12.1 | +14.0 |

The above-tabulated results point out some of the specific characteristics of capacitors produced using glasses within the scope of this invention. For example, the first recorded property demonstrates that the capacitors of this invention have a desirable low dielectric constant.

The Q-values were measured at two different frequencies (1 megahertz and 50 megahertz) for each capacitor using a Boonton Radio Model 260A Q meter. It was observed that at the standard 1 megahertz frequency, the Q-values desirably ranged from 811 to 1492. More importantly, the Q-values were higher at a higher frequency (i.e., 50 MHz.), ranging from 839 to 1978, and generally, higher than at 1 megahertz frequency. Since modern capacitors must be effective at the higher frequencies, the capacitors of this invention more than adequately fulfill these requirements.

The temperature (° C.) at which the dissipation factor (d.f.) rose over 1% at a frequency of 1 kilohertz was measured. The higher such temperature, the more desirable and better is the capacitor. The capacitors of this invention could be heated to 75–110° C. before over 1% electrical loss occurred at 1 kilohertz.

The capacitance change as a function of temperature was also recorded. A small capacitance change is, of course, desired. It can be seen that the capacitance change over two different temperature ranges was small.

Thus, capacitors produced from the capacitor dielectric compositions of this invention have an outstanding combination of electrical properties. In addition to having desirable high Q-values, the present capacitors have low dielectric constants, low dielectric loss (dissipation factor), and possess a small capacitance change per temperature change. These capacitors have new and unexpected properties which have not been obtainable from prior glasses.

Additionally, it has been observed that the Q-value is not only a function of the dielectric in the dielectric layer of the capacitor; Q-value is also a function of the specific metal, glass, and the amounts thereof in the electrodes. This is demonstrated by Table IV where various electrodes were prepared from different glass/metal mixtures. Capacitors having electrodes of various compositions were prepared (as previously described) using the same dielectrics of the invention in all cases. The Q-values were determined for each capacitor.

TABLE IV

[Effect of electrodes on Q of glass composition 3 as dielectric

| Electrodes | 1 | 2 | 3 | 4 | 5 | 6 | 7 | 8 |
|---|---|---|---|---|---|---|---|---|
| Glass (A)[1] | 3 | 3 | ------- | ------- | ------- | ------- | ------- | ------- |
| Glass 3[2] | ------- | ------- | 15 | 15 | 5 | 5 | ------- | ------- |
| Silver | ------- | 85 | ------- | 85 | ------- | 95 | 100 | ------- |
| Gold | 68 | ------- | 68 | ------- | 75 | ------- | ------- | 79 |
| Platinum | 17 | ------- | 17 | ------- | 20 | ------- | ------- | 21 |
| $Bi_2O_3$ | 12 | 12 | ------- | ------- | ------- | ------- | ------- | ------- |
| Q at 1 MHz | 1,200 | 1,310 | 1,940 | 2,014 | 2,400 | 2,648 | (3) | (3) |
| Q at 50 MHz | 1,070 | 1,140 | 1,810 | 1,694 | 2,020 | 2,116 | ∞ | ∞ |

[1] This glass consisted of 63.1% CdO, 16.9% $B^2O^3$, 12.7% $SiO^2$ and 7.3% NaO.
[2] This is Glass No. 3 from Table III.
[3] Greater than 3000.

It can be readily observed that by using a high Q glass (Glass No. 3) in the electrode, higher Q-values are obtained than when a low Q glass (Glass A) is utilized at the same frequencies as shown by electrodes 1 and 2. Moreover, by lowering the glass content and raising the metal content of the electrode, a much higher Q is obtained as shown by electrodes 5, 6, 7 and 8. Therefore, the amount of a particular glass used as the inorganic binder in the electrodes, as well as the kind of glass used, has a pronounced effect on the improvement of electrical properties in the electrodes.

It can be seen from the data tabulated in Tables III and IV that by using the particular glass compositions of this invention in the dielectric layers and/or in the electrodes of capacitors, a unique combination of properties, including low electric loss and high Q-values, can be readily obtained. While the above examples are intended to illustrate the preferred embodiments of this invention, this is in no way intended to limit the scope of this invention.

In preparing the capacitor dielectric compositions or the electrode metalizing compositions, any inert liquid may be utilized as the vehicle. Water or any one of various organic liquids, with or without thickening and/or stabilizing agents and/or other common additives, may be used. Examples of organic liquids that can be used are the aliphatic alcohols; esters of such alcohols, for example, the acetates and propionates; the terpenes such as pine oil, alpha- and beta-terpineol and the like; and solutions of resins such as the polymethacrylates of lower alcohols, or solutions of ethyl cellulose, in solvents such as pine oil and the monobutyl ether of ethylene glycol monoacetate (butyl—O—$CH_2CH_2$—$OOCH_3$). The vehicle may contain or be composed of volatile liquids to promote fast setting after application; or it may contain waxes, thermoplastic resins or the like materials which are thermofluid so that the vehicle-containing composition may be applied at an elevated temperature to a relatively cold ceramic body upon which the composition sets immediately.

The proportions of inert vehicle:solids (glass, metals, etc.) in the capacitor dielectric compositions and the electrode metalizing compositions may vary considerably depending upon the manner in which the paint or paste is to be applied and the kind of vehicle used. Generally, from 1 to 20 parts by weight of solids (glass, metals, etc.) per part by weight of vehicle will be used to produce a paint or paste of the desired consistency. Preferably, 4 to 10 parts of solids per part of vehicle will be used.

A wide variety of conductive metalizing compositions can be used to form the electrode layers of the present capacitors. While not intending to limit the scope of this invention, the preferred metals are noble metals and particularly gold, silver, platinum and palladium and mixtures thereof. Any of the other conventional conductive metals may also be used.

Any inorganic material which serves to bind the metals to the substrate can be used as the inorganic binder component of the electrode. The inorganic binder can be any of the glass frits employed in metalizing compositions of this general type. The patents to Larsen and Short, U.S. Pat. No. 2,822,279 and to Hoffman, U.S. Pat. No. 3,207,706 described some frit compositions which can be employed either alone or in combination with glass wetting agents such as bismuth oxide. Typical frit compositions usable as binder components in the electrodes include lead borate, lead silicate, lead borosilicate, cadmium borate, lead-cadmium borosilicate, zinc borosilicate and sodium-cadmium borosilicate. Of course, it is preferred to use the same glass which is used in the dielectric of this invention as the inorganic binder in the electrode. The proportions of metals and inorganic binder in the electrodes can be 80–99% and 1–20%, respectively.

The screen-printed capacitors of this invention are conveniently prepared by screen-stenciling a first conductive layer (referred to as an electrode) onto a ceramic substrate and thereafter screen-stenciling a dielectric composition of this invention thereover, followed by screen-stenciling a second conductive layer (referred to as a counterelectrode) over the first two layers. It should be noted that each of the two electrodes and the intermediate dielectric layer of the capacitor formed may be fired separately or at the same time, or the dielectric layer may be fired with either of the two electrodes. Capacitors having more than one electrode and more than one counterelectrode can be screen-stenciled onto the ceramic substrate as desired. The deposited layers may be fired in any number of firings desired. Connection of the electrodes and counterelectrodes in separate electrically parallel relationship may be achieved by extending the dimensions of the electrodes in a first direction beyond the dimensions of the dielectric layers and extending the dimensions of the counterelectrodes in a second direction beyond the dimensions of the dielectric layers.

By using the teachings of this invention, capacitor dielectric compositions and electrode compositions can be printed and fired to yield highly efficient capacitors having low dielectric losses and high Q-values. The critical combination of ingredients and proportions which characterize this invention result in capacitors having a unique combination of electrical properties not known in the art.

I claim:

1. A glass composition which consists essentially of 45–60 weight percent $B_2O_3$, 8–10 weight percent CaO, 4–6 weight percent BaO, 4–6 weight percent $ZrO_2$, 12–18 weight percent $Al_2O_3$, 5–15 weight percent $SiO_2$ 4–5 weight percent ZnO, and 0–5 weight percent SrO.

2. A capacitor dielectric composition comprising a finely divided glass powder of a composition consisting essentially of 30–65 weight percent $B_2O_3$, 3–7 weight percent BaO, 6–12 weight percent CaO, 3–7 weight percent $ZrO_2$, 0–20 weight percent $Al_2O_3$, 0–25 weight percent $SiO_2$, 0–6 weight percent ZnO, and 0–6 weight percent SrO, dispersed in an inert vehicle.

3. A capacitor dielectric composition in accordance with claim 2 wherein the glass composition consists essentially of 45–60 weight percent $B_2O_3$, 8–10 weight percent CaO, 4–6 weight percent BaO, 4–6 weight percent $ZrO_2$, 12–18 weight percent $Al_2O_3$, 5–15 weight percent $SiO_2$, 4–5 weight percent ZnO, and 0–5 weight percent SrO.

References Cited

UNITED STATES PATENTS

| | | | |
|---|---|---|---|
| 3,207,706 | 9/1965 | Hoffman | 106—54 X |
| 3,306,757 | 2/1967 | d'Adrian | 106—54 |

FOREIGN PATENTS

| | | |
|---|---|---|
| 513,407 | 8/1952 | Belgium. |

TOBIAS E. LEVOW, Primary Examiner

M. L. BELL, Assistant Examiner

U.S. Cl. X.R.

106—47, 48; 317—258